US011642612B2

(12) United States Patent
Otahal et al.

(10) Patent No.: US 11,642,612 B2
(45) Date of Patent: May 9, 2023

(54) FILTER ELEMENT HAVING TWO FILTER MEDIA

(71) Applicant: Robert Bosch GmbH, Stuttgart (DE)

(72) Inventors: Jan Otahal, Trebon (CZ); Reinhard Taferl, Thalgau (AT); David Ayza Parra, Castellon de la Plana (ES); Jose Luis Arias Arias, Madrid (ES); Miguel Martinez Gomez, Aranjuez (ES); Miguel Castejon Lopez, Madrid (ES); Sara Diaz Manzanero, Madrid (ES)

(73) Assignee: ROBERT BOSCH GMBH, Stuttgart (DE)

( * ) Notice: Subject to any disclaimer, the term of this patent is extended or adjusted under 35 U.S.C. 154(b) by 669 days.

(21) Appl. No.: 16/071,368

(22) PCT Filed: Jan. 23, 2017

(86) PCT No.: PCT/EP2017/051288
§ 371 (c)(1),
(2) Date: Jul. 19, 2018

(87) PCT Pub. No.: WO2017/129511
PCT Pub. Date: Aug. 3, 2017

(65) Prior Publication Data
US 2021/0187418 A1     Jun. 24, 2021

(30) Foreign Application Priority Data

Jan. 29, 2016   (DE) .......................... 102016201334.3

(51) Int. Cl.
*B01D 29/54*     (2006.01)
*B01D 29/21*     (2006.01)
(Continued)

(52) U.S. Cl.
CPC ............. *B01D 29/54* (2013.01); *B01D 29/21* (2013.01); *B01D 46/10* (2013.01); *B01D 29/66* (2013.01); *B01D 2321/2083* (2013.01)

(58) Field of Classification Search
CPC .......................... B01D 29/54; B01D 2201/298
See application file for complete search history.

(56) References Cited

U.S. PATENT DOCUMENTS 3,297,162 A * 1/1967 Mouwen ................ B01D 27/08
                                                   210/132
3,503,509 A * 3/1970 Kudlaty ............... B01D 29/114
                                                   210/132
(Continued)

FOREIGN PATENT DOCUMENTS

DE       1948958 A1    6/1971
DE       4214694       11/1993
(Continued)

OTHER PUBLICATIONS

Durst, et al.: "Filtration in Vehicles. Principles and Examples for Air, Oil and Fuel Filtration" [in German, with English translation of an abstract], Publ. Verlag Moderne Industrie, (2002), pp. 1-13.
(Continued)

*Primary Examiner* — Benjamin M Kurtz
(74) *Attorney, Agent, or Firm* — Norton Rose Fulbright US LLP; Gerard Messina

(57) ABSTRACT

A filter element includes an unfiltered side via which a fluid is able to be introduced, and a filtered side via which fluid is able to be output, and first and second filter mediums that are situated between the unfiltered and filtered sides, where the first filter medium has a lower relative pressure loss than the second filter medium in a flow direction of the fluid from the filtered side to the unfiltered side.

12 Claims, 3 Drawing Sheets

(51) Int. Cl.
    *B01D 46/10* (2006.01)
    *B01D 29/66* (2006.01)

(56) References Cited

U.S. PATENT DOCUMENTS

| | | | | |
|---|---|---|---|---|
| 3,726,403 A * | 4/1973 | Shaltis | ............... | B01D 27/02 |
| | | | | 210/132 |
| 4,038,189 A * | 7/1977 | Dison | ............... | B01D 29/54 |
| | | | | 210/90 |
| 6,391,193 B1 | 5/2002 | Luka | | |
| 2012/0223001 A1 | 9/2012 | Beard | | |

FOREIGN PATENT DOCUMENTS

| | | |
|---|---|---|
| DE | 69203090 T2 | 2/1996 |
| DE | 19752376 A1 | 5/1999 |
| DE | 102012221890 A1 | 6/2014 |
| JP | S5599313 A | 7/1980 |
| JP | 2014509934 A | 4/2014 |
| WO | 2016010973 A1 | 1/2016 |

OTHER PUBLICATIONS

International Search Report dated Apr. 3, 2017 of the corresponding International Application PCT/EP2017/051288 filed Jan. 23, 2017.

\* cited by examiner

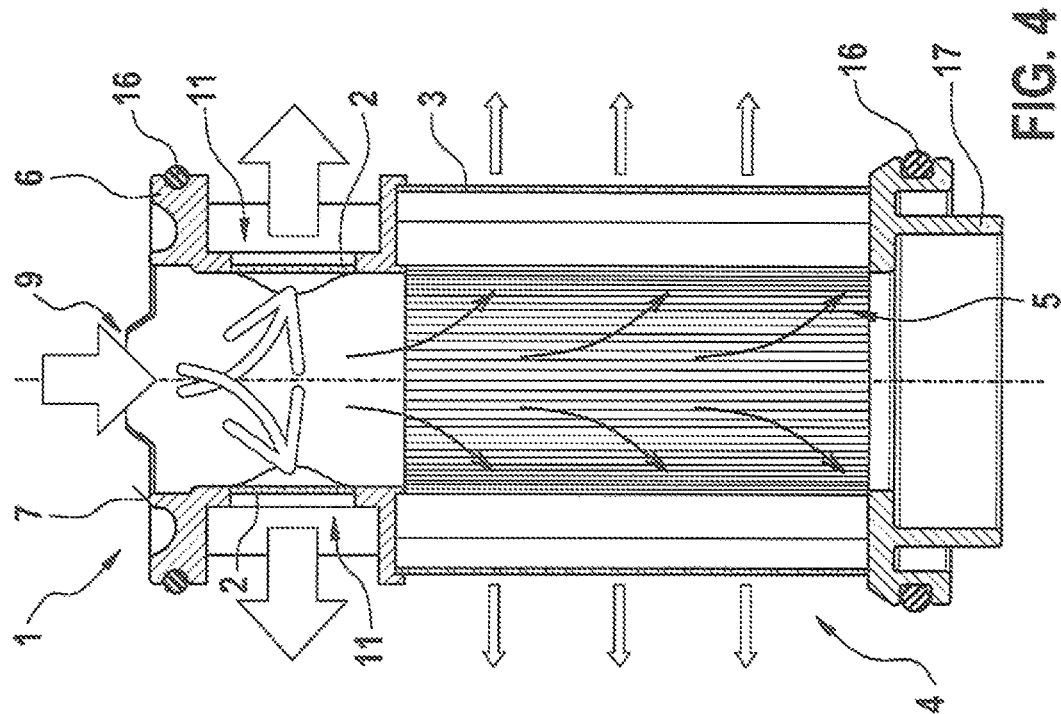
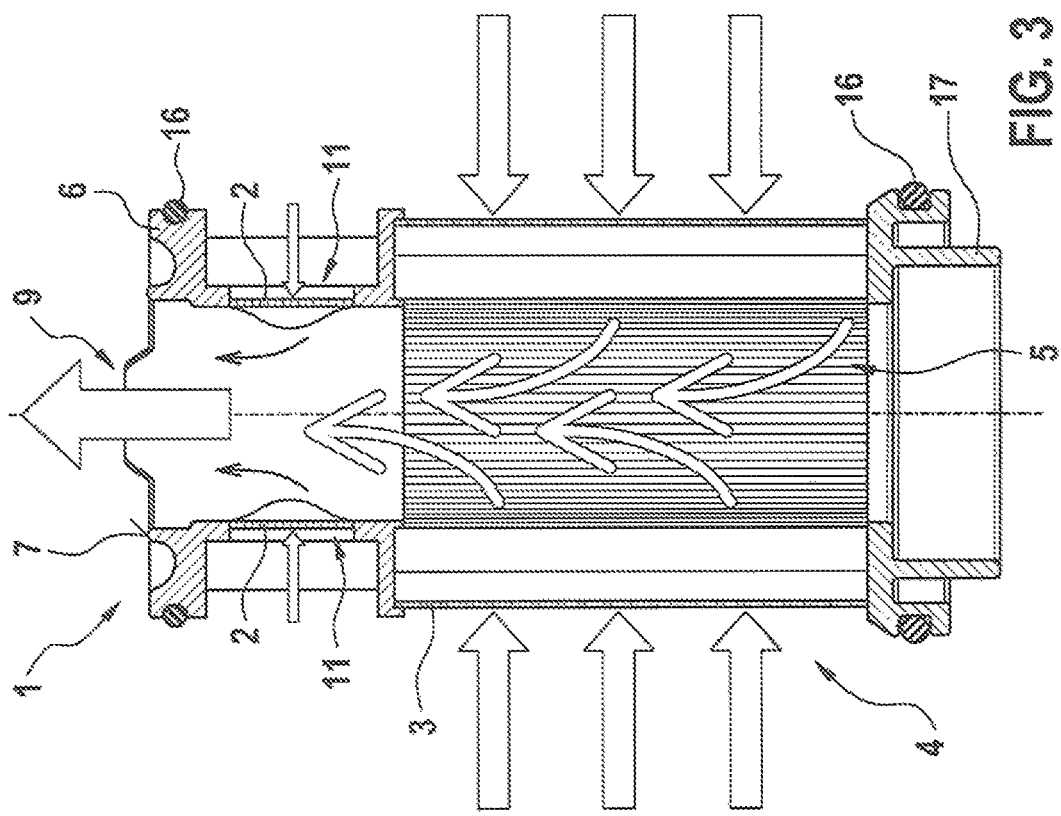

FILTER ELEMENT HAVING TWO FILTER MEDIA

CROSS-REFERENCE TO RELATED APPLICATIONS

The present application is the national stage of International Pat. App. No. PCT/EP2017/051288 filed Jan. 23, 2017, and claims priority under 35 U.S.C. § 119 to DE 10 2016 201 334.3, filed in the Federal Republic of Germany on Jan. 29, 2016, the content of each of which are incorporated herein by reference in their entireties.

FIELD OF THE INVENTION

The present invention relates to a filter element and to a filter module including such a filter element, where a fluid is able to be filtered using the filter element.

BACKGROUND

Filter elements are known from the related art. They are used if a system that is to be supplied with a working fluid exhibits a sensitive reaction to a contamination of the working fluid. Such a contamination is able to be avoided by filter modules. Filter elements of this type are employed especially in motor vehicles where they filter urea or fuel (e.g., diesel or gasoline) that is used as a respective operating means of the vehicle.

Depending on the freezing point of the fluid to be filtered, it can happen that the fluid (e.g., the urea solution) freezes or flocculates at low external temperatures (as in the case of diesel). In order to avoid this, the filter module and/or the filter element can be designed to be heatable, which increases the energy consumption and makes the development of the filter module or the filter element cost-intensive.

Such a filter module is known from the document DE 10 2012 221 890 A1.

Also known are systems that are not filled with the working fluid during a standstill or in other states. In such a case a pump must change a pumping direction in order to remove the working fluid from the system again. However, this can have the result that the working fluid flows through the filter element in the return flow and thus detaches filtered-out particles from the filter element. Detached particles can subsequently reach the pump and damage it.

SUMMARY

Embodiments of the present invention provide a filter element that advantageously allows for a return flow of fluids without allowing particles that were already filtered out to return to a pump. For this purpose, the filter element according to the present invention includes a first filter medium and a second filter medium that especially is able to be distinguished from the first filter medium. In addition, the filter element has an unfiltered side and a filtered side, and a fluid can be introduced into the filter element via the unfiltered side and a fluid can be output from the filter element via the filtered side. It is provided that both the first filter medium and the second filter medium are situated directly between the filtered side and the unfiltered side of the filter element. More specifically, it is provided that the first filter medium and the second filter medium are situated parallel to each other in their mode of action.

This particularly means that the first filter medium as well as the second filter medium are exposed both with respect to the unfiltered side and the filtered side. A series connection of the modes of action of the first filter medium and the second filter medium is not a subject matter of the present invention.

The filtered side is thus separated from the unfiltered side by the first filter medium and the second filter medium. This ensures that particles that are present in a fluid on the unfiltered side are filtered out at the first filter medium and/or at the second filter medium when the fluid is flowing through the filter element, and that the particles are thus unable to reach the filtered side.

According to the present invention, it is furthermore provided that the first filter medium has a lower relative pressure loss than the second filter medium in a flow direction of the fluid from the filtered side to the unfiltered side. This particularly applies in a stationary phase, some time following the onset of the normal operation featuring a flow direction from the unfiltered to the filtered side.

A relative pressure loss in particular means that the first filter medium produces a lower pressure loss of the fluid than the second filter medium given standardized metering and flow rate of the fluid. The pressure loss especially corresponds to the difference between the fluid pressure on the unfiltered side and the filtered side.

A higher throughput of fluid through the first filter medium than through the second filter medium therefore takes place. This makes it possible to prevent particles that adhere to the second filter medium from detaching from the second filter medium when a fluid is flowing through the filter element from the filtered side to the unfiltered side. In this way it is avoidable that a pump that is located on the unfiltered side of the filter element sustains damage due to particles that are detaching, e.g., in an abrupt manner, from the second filter medium. At the same time, the filter element allows for a return flow by reversing a pumping direction so that a system supplied with fluid is able to get rid of the fluid.

In an advantageous manner, it is furthermore provided that a through-flow through the first filter medium and the second filter medium is possible both in a flow direction of the fluid from the filtered side to the unfiltered side and from the unfiltered side to the filtered side. As previously described, the filter properties of the first filter medium and the second filter medium differ from each other so that the first filter medium exhibits the lower relative pressure loss in the flow direction of the fluid from the filtered side to the unfiltered side.

The first filter medium is preferably a surface filter. Alternatively or additionally, it is advantageously provided that the second filter medium is a depth filter. Developing the first filter medium as a surface filter in particular can lead to rapid clogging during a fluid flow from the unfiltered side to the filtered side. The clogging of the surface filter by a filter cake, or the lower flow rate or the increased resistance with regard to a fluid flow at the first filter medium, causes a very large or even a predominant share of the fluid to flow through the second filter medium. As a result, only very few particles adhere to the first filter medium so that in a reversal of the fluid flow, also only relatively few particles (i.e., those of the filter cake) are able to detach from the first filter element and find their way back to the unfiltered side.

At least within a short period of time, the second filter medium thus has a lower relative pressure loss than the first filter medium in a flow direction of the fluid from the unfiltered side to the filtered side.

Because of the development of the second filter medium as a depth filter, the deposition of the particles especially takes the form of an adhesion of filtered-out particles to or in the second filter medium. The particles are retained in the filter medium by electrostatic or by van-der-Waals forces, for example. The retained particles are difficult to detach in comparison with the particles on the topside of the first filter medium. In a flow direction of the fluid from the filtered side to the unfiltered side, the particles of the filter cake are therefore easier to be detached from the first filter medium because of its development as a surface filter. Since the second filter medium is switched in parallel, this involves only very few particles in the filter cake that clog the pores and steer the fluid flow to the second filter medium.

It is therefore provided that the flow through the first filter medium mainly takes place in a fluid flow from the filtered side to the unfiltered side since the flow resistance is lower in such a case, at the latest after the particles of the filter cakes have become detached. This is so because the flow of the fluid through the second filter medium is then no longer sufficient to detach the particles retained there counter to the holding forces and to carry them to the unfiltered side.

In contrast, the flow through the second filter medium mainly takes place during a fluid flow from the unfiltered side to the filtered side; the first filter medium is quickly clogged in this direction of the fluid flow, and the fluid flow essentially takes place through the second filter medium.

Therefore, the second filter medium is mainly used for filtering out particles during a normal operation, i.e., while fluid is flowing from the unfiltered side to the filtered side. In a return flow, i.e., a fluid flow from the filtered side to the unfiltered side, these particles are not detached from the second filter medium because in this case the fluid mainly flows through the first filter medium. Since only a small quantity of particles is filtered out at the first filter medium and thus adheres to the first filter medium due to the higher relative pressure loss during a fluid flow from the unfiltered side to the filtered side, only this small quantity is detached from the filter element during the return flow. However, this is negligible in its effect on further components. As a result, there is a lower risk that a pump disposed on the unfiltered side will be damaged by detached particles.

In other words, the first filter medium can be considered to be a type of autonomous device valve. The first filter medium is the "valve seat," and the particles that are situated on the unfiltered side, deposit on the first filter medium and clog it are the "valve bodies." In a reversal of the fluid flow, the particles acting as valve bodies are rinsed away from the valve seat (the pores) of the first filter medium, and the "valve" opens.

In addition, it is advantageously provided that the first filter medium and the second filter medium have different dimensions. In particular, the first filter medium and the second filter medium have different dimensions in those areas that are facing the unfiltered side of the filter elements. In an especially advantageous manner, the second filter medium has a larger dimension than the first filter medium, which means that the second filter medium particularly has a larger surface that is exposed with respect to the unfiltered side of the filter element than the first filter medium. A larger surface of the second filter medium is achieved in particular in that the first filter medium has a planar surface while the second filter medium has zigzag-type pleats. This also restricts the number of particles that is required to clog the first filter medium and which can thus be carried back to the unfiltered side in a reversal of the fluid direction.

This especially ensures that in a normal operation of the filter element, i.e., during a fluid flow from the unfiltered side to the filtered side, a fluid flow takes place through the second filter medium for the most part. Therefore, it is provided that particles are mainly filtered out at the second filter medium and thus adhere to the second filter medium. Only a smaller number of particles preferably adheres to the first filter medium so that in a return-flow operation, i.e., in a fluid flow from the filtered side to the unfiltered side, which takes place through the first filter medium for the most part, the number of the particles detached from the second filter medium is reduced. A risk of damage to a pump located on the unfiltered side due to detached particles is thus reduced.

The second filter medium is preferably developed in the form of a hollow cylinder. The second filter medium thus preferably has a center axis, a lateral surface, and two end faces. In this context, it is especially provided that the lateral area is exposed in relation to the unfiltered side of the filter element. Via the end faces, filtered fluid that is situated within the space enclosed by the second filter medium after flowing through the hollow-cylindrical second filter medium is able to be output. As a result, the second filter medium has a very stable design and simultaneously has a large surface area relative to the enclosed volume, which is exposed relative to the unfiltered side.

As a matter of principle, the filtered side can also lie outside the lateral area and the unfiltered side lie inside the lateral area. The unfiltered fluid can then be introduced into the space enclosed by the second filter space.

In addition, it is preferably provided that the second filter medium has a lid element on at least one end face and that the first filter medium is disposed on the lid element. The first filter medium can be situated on a wall of the cover element or in a wall. The first filter medium is preferably attached to the lid element in an irreversible manner. The second filter medium can advantageously have two such lid elements or alternatively have only one such lid element. In the latter case, it is preferably provided that the remaining end face of the second filter medium has a lid element that covers the end face and especially provides sealing with respect to the second filter medium. The first filter medium and the second filter medium are disposed separately from each other due to the lid element. It is especially provided that both the first filter medium and the second filter medium are sealed with respect to the lid element so that no leaks are present within the filter element.

More specifically, it is preferably provided that the lid element is given the form of a hollow cylinder and has an outlet on an end face. Fluid is able to be output via the outlet from the filtered side of the filter element. The filtered side of the filter element especially corresponds to the volume that is enclosed both by the second filter medium and the lid element. It is therefore possible to output filtered fluid from the filter element by way of the outlet.

It is also conceivable that the unfiltered fluid is able to be introduced via an inlet on an end face of the lid element. During a normal operation, the flow through the second filter medium can then take place from the inside to the outside.

In an especially advantageous manner, the lid element is provided with an opening on a lateral side, via which the filtered side is connected to the unfiltered side, the first filter medium covering the at least one opening. On the one hand, it is therefore advantageously the case that the first filter medium is situated close to the outlet. In the case of a flow direction from the outlet back to the unfiltered side of the filter element, the fluid therefore needs to travel only a short distance. More specifically, the fluid merely flows through the lid element and not through the second filter medium. Via the at least one opening on the lateral side, on the other hand, the first filter element is exposed via one surface with respect to the unfiltered side of the filter element, similar to the second filter medium. As a result, fluid is able to be routed through the first filter medium in order to then flow between the filtered side and the unfiltered side, and vice versa.

In this context, as previously described, it is preferably provided that the fluid flows from the unfiltered side to the filtered side during a normal operation of the filter element, this flow taking place through the second filter medium for the most part and only to a lesser part through the first filter medium and the at least one opening. In a return-flow operation, on the other hand, fluid flows from the filtered side to the unfiltered side, this largely taking place through the at least one opening and the first filter medium and only to a lesser part through the second filter medium.

The first filter medium and/or the second filter medium is/are preferably connected to the lid element by a substance-to-substance bond and/or by a positive engagement and/or a frictional engagement. In a particularly advantageous manner, the first filter medium and the second filter medium are glued to the lid element. This ensures that the first filter medium and the second filter medium are tightly connected to the lid element, so that leaks between the first filter medium and the lid element and also between the second filter medium and the lid element are avoided.

In a particularly advantageous manner, the first filter medium and the second filter medium are made from different materials. The first filter medium and the second filter medium thus have different filter characteristics. In one alternative it is provided that the first filter medium and the second filter medium are made from the same material, and that the first filter medium and the second filter medium differ in their form, which in turn provides different filter characteristics. In particular, the first filter medium and the second filter medium can differ in their respective strengths or thicknesses. The differences in the filter characteristics advantageously produce the aforementioned different relative pressure loss during the fluid flow through the filter media.

The filter element preferably has a valve for the optional avoidance of a fluid flow through the first filter medium. The valve can be placed in different locations and especially is closed during a normal operation of the filter element, i.e., during a fluid flow from the unfiltered side to the filtered side. The closing of the valve therefore has the result that no fluid flow takes place through the first filter medium, and thus in particular also no fluid flow through the at least one opening of the lid element. It is therefore possible to prevent the first filter medium from also filtering out particles from the fluid, in addition to the second filter medium. In a return-flow operation, i.e., in a fluid flow from the filtered side to the unfiltered side, the valve makes it possible to prevent particles from detaching from the first filter medium (since only a few particles or no particles are depositing thereon).

This valve is an element that is separate from the first and the second filter medium. For example, the first filter medium can be disposed in a separate space on the filtered or unfiltered side, the valve allowing the fluid to access this space (open valve) or preventing such access (closed valve). The valve can be developed as a mechanical non-return valve, for instance, which opens (in a return flow) or closes (during a normal operation) solely due to the fluid flow. However, the valve can also be an electrically or electronically controlled or actuated valve. Such a valve, for example, can be coupled with the operation of the pump for pumping fluid out of the filter in the return-flow operation and can open when the pump is starting up, or it can be connected to a control unit, which closes the valve as a function of a return-flow operation or which closes it during a normal operation.

Finally, the present invention relates to a filter module that includes a housing. A filter element as described is disposed inside the housing. The housing preferably has an inlet and an outlet for fluids. Such a filter module advantageously allows for a return flow of fluid, counter to the normal operating direction, in which a detachment of particles that were filtered out by the filter element is reduced or prevented. The risk of damage to components that are situated upstream from the filter element during a normal operation is therefore reduced in the return-flow operation. The filter module is part of a urea-injection system of a motor vehicle, in particular.

The first filter medium is preferably formed from a diaphragm of plastic. The plastic especially includes polypropylene (PP), polybutylene terephthalate (PBT), or polyether ether ketone (PEEK). The second filter element is preferably made from cellulose and can particularly include hot-drawn fibers. The hot-drawn fibers are advantageously produced according to the meltblown method.

In the following text, exemplary embodiments of the present invention are described in detail with reference to the appended drawings.

BRIEF DESCRIPTION OF THE DRAWINGS

FIG. 3 is a schematic view of the filter element according to the exemplary embodiment of the present invention in a normal operation.

FIG. 4 is a schematic view of the filter element according to the exemplary embodiment of the present invention in a return-flow operation.

DETAILED DESCRIPTION

Figure 2:
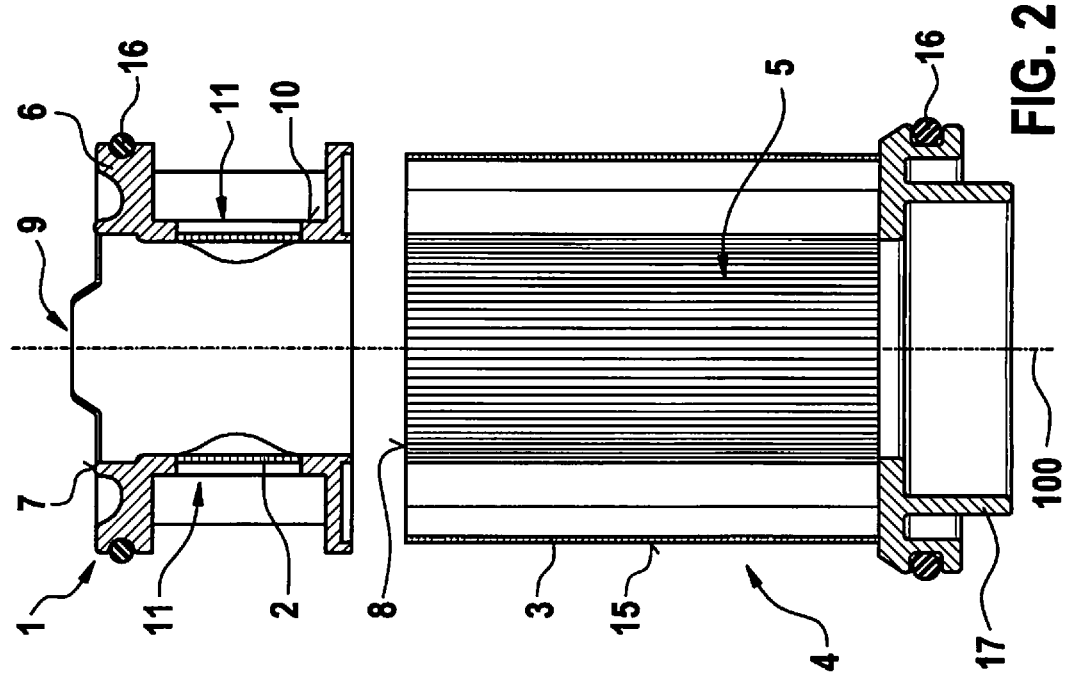
FIG. 2 is a schematic sectional view of the filter element according to the exemplary embodiment of the present invention.
Figure 1:
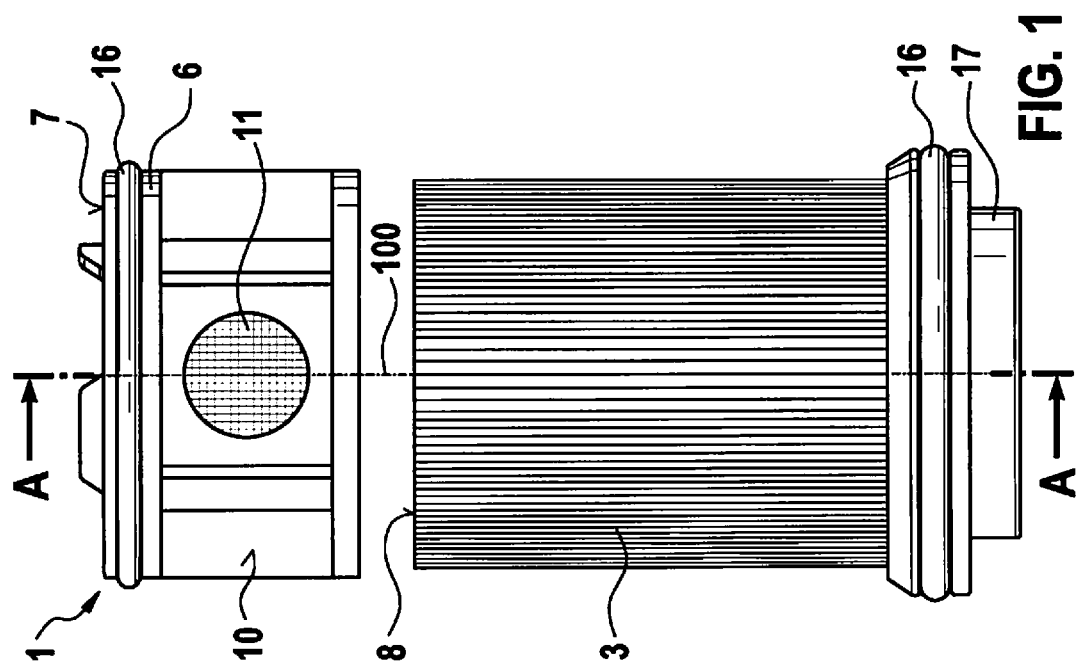
FIG. 1 is a schematic illustration of a filter element according to an exemplary embodiment of the present invention.

FIG. 1 schematically shows an exploded view of a filter element 1 according to an exemplary embodiment of the present invention. FIG. 2 is a sectional view of FIG. 1 along sectional line A-A. Filter element 1 includes a first filter medium 2 and a second filter medium 3. First filter medium 2 is distinguishable from second filter medium 3, first filter medium 2 and second filter medium 3 in particular having different filter characteristics. More specifically, first filter medium 2 is a surface filter while second filter medium 3 is a depth filter. In addition, filter element 1 has a lid element 6. Lid element 6 is disposed on second filter medium 3 and provided to accommodate first filter medium 2. Lid element 6 and second filter medium 3 are connected to each other in a fluid-tight manner.

Second filter medium 3 is developed in the form of a hollow cylinder. It is provided that second filter medium 3 has a center axis 100 and an end face 8. Lid element 6 is situated on end face 8 and is preferably developed in the shape of a hollow cylinder and has two openings 11 on a lateral side 10. Openings 11 are covered by first filter medium 2.

Filter element 1 has an unfiltered side 4 and a filtered side 5. Filtered side 5 corresponds to a volume that is enclosed by second filter medium 3 and by lid element 6, which are both developed in the form of a hollow cylinder. Via an outlet 9, which is situated on an end face 7 of lid element 6, fluid is able to be output from filtered side 5. Filtered fluid is thus able to be output from filtered side 5 via outlet 9. Unfiltered side 4 corresponds to a volume radially outside a lateral surface 15 of second filter medium 3 and lateral side 10 of lid element 6. Since lateral side 10 of lid element 6 has two openings 11, which are covered by first filter medium 2, fluid can flow from unfiltered side 4 to filtered side 5 both through first filter medium 2 and through second filter medium 3.

It is also possible that unfiltered side 4 lies within lateral side 10 and filtered side 5 lies outside lateral side 10.

First filter medium 2 and second filter medium 3 are thus disposed parallel to each other in their direction of action. Both first filter medium 2 and second filter medium 3 separate unfiltered side 4 from filtered side 5. As a result, a fluid is filtered when it is flowing from unfiltered side 4 through filter element 1 to filtered side 5. Both filter media 2, 3 can thus be disposed directly between the filtered and the unfiltered side.

First filter medium 2 and second filter medium 3 are preferably connected to lid element 6 by a substance-to-substance connection, in particular bonded. This ensures a tight attachment of first filter medium 2 and second filter medium 3 on lid element 6 so that filter element 1 exhibits no leaks. First filter medium 2, for example, can be bonded to the edges of openings 11 or be connected to the edges of openings 11 in a fluid-tight manner with the aid of a welding process (friction-welding, laser welding). Second filter medium 3 can be bonded, for instance via its end face 8, to, in the figure, the lower side of the jacket of lid element 6.

In the exemplary embodiment illustrated in the figures, filter element 1 has only one lid element 6, as described. A cover element 17 is mounted on the side of second filter medium 3 that lies opposite lid element 6. Cover element 17 is used for sealing filtered side 5 from unfiltered side 4. Both lid element 6 and cover element 17 preferably have sealing elements 16 (e.g., O-rings) via which filter element 1 is able to be sealed inside a housing 12 (see FIG. 5). In particular, lateral side 10 of lid element 6 and lateral side 15 of second filter medium 3 are separated or sealed from outlet 9 with the aid of sealing elements 16 if filter element 1 is disposed within housing 12. Housing 12 thus makes it possible to reliably route a fluid from unfiltered side 4 through filter element 1 to filtered side 5 without leakage flows.

FIG. 3 and FIG. 4 show filter element 1 during a fluid flow. FIG. 3 shows a normal operation in which filter element 1 is traversed in a flow direction of the fluid from the unfiltered side to the filtered side, while a fluid flow from filtered side 5 to unfiltered side 4, and thus a return flow, prevails in FIG. 4.

It is preferably provided that the particular surface of second filter medium 3 that is exposed with respect to unfiltered side 4, i.e., lateral surface 15, is larger than the particular surface of first filter medium 2 that is exposed with respect to unfiltered side 4, which corresponds to the cumulated cross-sectional area of openings 11. For example, this can be achieved in that first filter medium 2 is given a planar surface while second filter medium 3 is pleated using a zigzag pattern. In addition, it is preferably provided that second filter medium 3 exhibits a lower relative pressure loss than first filter medium 2 in a flow direction of the fluid from unfiltered side 4 to filtered side 5. This is particularly achieved in that first filter medium 2 is a surface filter while second filter medium 3 is a depth filter. Because of the development as a surface filter, faster clogging of first filter medium 2 by filtered-out particles than is the case in the second filter medium takes place. As a result, for the most part, a fluid flows through filter element 1 through second filter medium 3 during a normal operation, while a flow through first filter medium 2 is only of lesser importance. Different arrow strengths, which symbolize the different distribution of the through-flow rates, are provided in FIG. 3 for this purpose.

During a normal operation, it is therefore ensured that fluid, possibly after a brief startup period of a few seconds, for instance, is mainly filtered by second filter medium 3. A deposit of filtered-out particles thus largely takes place on second filter medium 3. The particles held in second filter medium 3 are detachable only with difficulty. In contrast, the particles, as a type of filter cake, clog first filter medium 2 relatively quickly during a normal operation.

In a return-flow operation, i.e., during a fluid flow from filtered side 5 to unfiltered side 4, it is provided that the fluid mainly flows through first filter medium 2. For this purpose it is preferably provided that first filter medium 2 has a lower relative pressure loss than second filter medium 3 in a flow direction of the fluid from filtered side 5 to unfiltered side 4, at least after a brief period of time (a few seconds) after the start of the return-flow operation, i.e., in a stationary phase of the return-flow operation. In particular, this is achieved in that, due to the development of first filter medium 2 as a surface filter, the adhering particles are easily detachable from first filter medium 2 by the return-flow operation, while the particles adhering to second filter medium 3 are detachable only with difficulty. Since it is furthermore provided that first filter medium 2 covers openings of lid element 6, a short flow distance from outlet 9 through lid element 6 and openings 11 to unfiltered side 4 is advantageously provided. Because the largest share of the filtered-out particles adheres to second filter medium 3, only a slight detachment of such particles from second filter medium 3 occurs since the fluid in the return-flow operation predominantly flows through first filter medium 2 and only to a lesser extent through second filter medium 3. This is so because particles are retained more strongly in second filter medium 3 than in the first filter medium, and the partial pressure at the second filter medium in the stationary phase of the return-flow operation is then no longer sufficient to detach an undesirably high number of particles from the second filter medium. This protects a pump that is present from damage caused by particles that have detached from filter element 1.

In an especially advantageous manner, filter module 13 can have an additional valve 20 with the aid of which no fluid flow through first filter medium 2 takes place during the normal operation illustrated in FIG. 3. Thus, the valve 20 is advantageously closed when a normal operation is present, with the result that fluid can flow exclusively through second filter medium 3 so that particles adhere only to second filter medium 3 or to the inside of second filter medium 3. In the return-flow operation, which is shown in FIG. 4, no particles will then be detached from first filter medium 2, so that the risk of damage to other components, in particular to a pump, is further reduced. As described earlier in the text, the valve 20 can be a mechanical non-return valve or an electrically or electronically actuated valve (such as a solenoid valve). The valve 20 can then be linked together with the pump-off pump, for example, and be opened when the return-flow mode is initiated. First filter medium 2, for example, can be disposed in a separate room that is able to be released by the valve 20 and that is disposed on the unfiltered side.

In the described exemplary embodiment, filter element 1 has a lid element 6 provided with two openings 11. Alternatively, lid element 6 can have a plurality of openings 11, especially three, four, five, six, or even more openings 11. In a further alternative, filter element 1 can have a plurality, especially two, lid elements 6 as described, e.g., one as illustrated on the top of the figure and one (not shown) on the bottom, in place of cover element 17.

Figure 5:
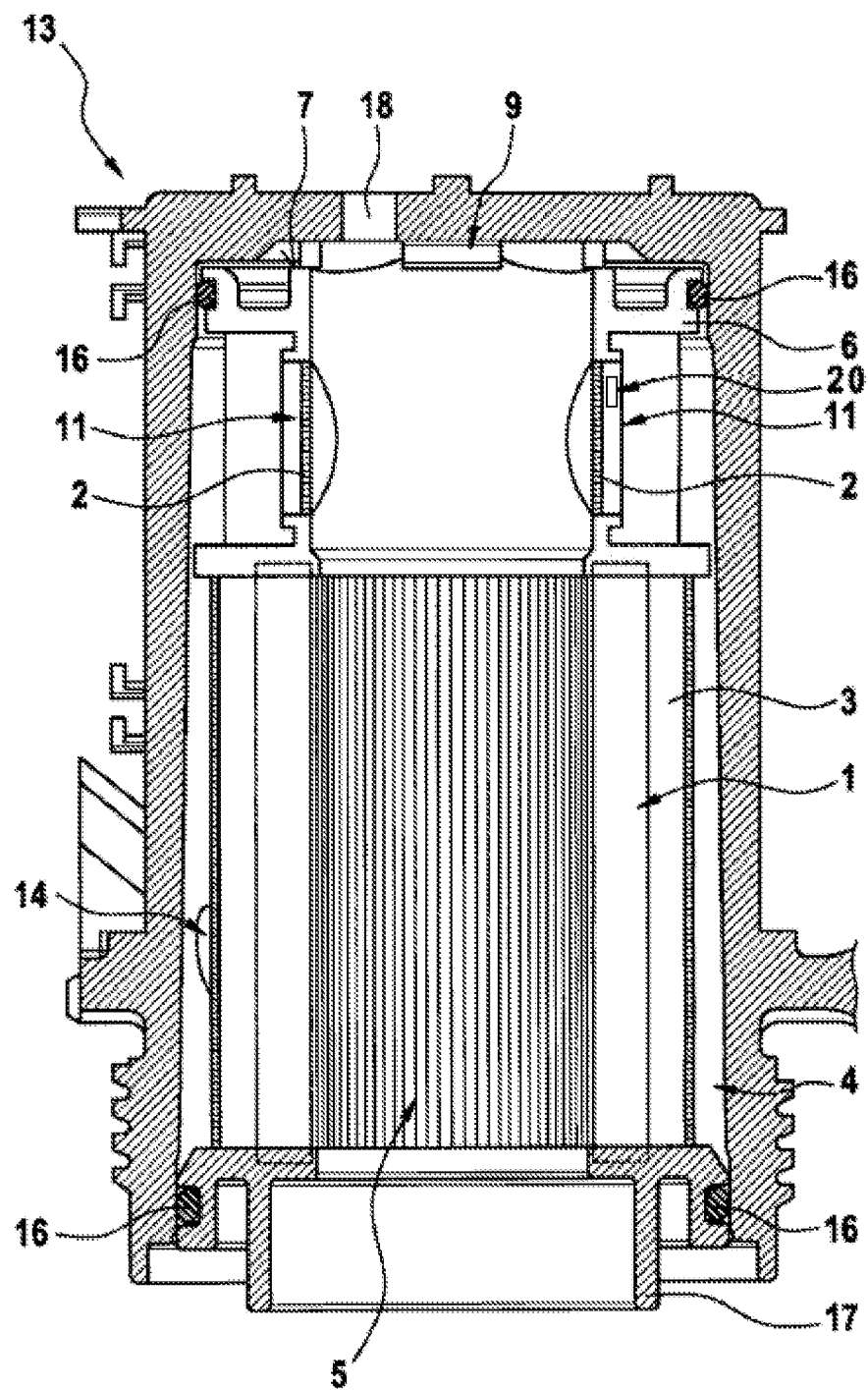
FIG. 5 is a schematic view of a filter module according to an exemplary embodiment of the present invention.

FIG. 5 schematically shows a filter module 13 according to an exemplary embodiment of the present invention. Filter module 13 includes a filter housing 12 as well as a filter element 1 as previously described. Filter module 13 in particular is part of a urea-injection system of a vehicle.

Filter module 13 has an inlet 14 and an overall outlet 8. Via inlet 14, fluid is able to be introduced into filter module 13. The fluid is thus located on unfiltered side 4 of filter element 1 and is filtered by first filter medium 2 and second filter medium 3. Via outlet 9 of filter element 1, fluid from filter element 1 is able to be output from filter module 13 by way of overall outlet 18.

Because of filter element 1, filter module 13 advantageously allows for a return-flow operation without filtered-out particles becoming detached from filter element 1 in the process and without having the ability to return to a pump. A return-flow operation is necessary whenever the system supplied with fluid is to be rid of the fluid. This especially is the case in the mentioned application since urea substances, in particular, that are used there as operating substances are to be removed from the system due to the danger of frost. A return-flow operation means that fluid is aspirated via overall outlet 18 of filter module 13 and outlet 9 of filter element 1 and is output via inlet 14 of filter module 13.

However, filter module 13 and filter element 1 can also be used as a fuel filter, e.g., for diesel or gasoline. In this context, the term 'fuel filter' can also be used for a filter for filtering a urea solution.

What is claimed is:

1. A filter element comprising:
   an unfiltered side via which a fluid is able to be introduced;
   a filtered side via which the fluid is able to be output;
   a first filter medium arranged between the unfiltered and filtered sides; and
   a second filter medium arranged between the unfiltered and filtered sides and having a higher relative pressure loss than the first filter medium in a flow direction of the fluid from the filtered side to the unfiltered side,
   wherein the first filter medium is a surface filter, and the second filter medium is a depth filter,
   wherein during a normal operation, the second filter medium is configured for primarily filtering out particles present in the fluid,
   wherein the second filter medium is operable in a reverse operation in which a pumping direction is reversed, which causes the fluid to primarily flow through the first filter in a return flow direction,
   wherein the second filter medium has a surface that is exposed to the unfiltered side of the filter element that is larger than a surface of the first filter medium that is exposed to the unfiltered side,
   wherein the first filter medium has a planar surface, and the second filter medium has a zigzag shaped surface.

2. The filter element of claim 1, wherein the first filter medium and the second filter medium have different dimensions.

3. The filter element of claim 1, wherein the second filter medium has a hollow-cylindrical form and the filter element further comprises a lid element on at least one end face of the second filter medium, with the first filter medium being disposed on the lid element.

4. The filter element of claim 3, wherein the lid element has a hollow-cylindrical form and has an outlet on one end face of the lid element by which the fluid can be output from the filtered side.

5. The filter element of claim 4, wherein the lid element has at least one opening on a lateral side of the lid element via which the filtered side is connected to the unfiltered side, the first filter medium covering the at least one opening.

6. The filter element of claim 3, wherein at least one of the first filter medium and the second filter medium is connected to the lid element at least one of in a substance-to-substance bond, by a positive engagement, and by a frictional engagement.

7. The filter element of claim 1, wherein the first filter medium and the second filter medium are formed of different materials.

8. The filter element of claim 1, further comprising a valve for avoidance of a fluid flow through the first filter medium.

9. A filter module comprising:
   a housing; and
   in the housing, a filter element that includes:
      an unfiltered side via which a fluid is able to be introduced;
      a filtered side via which the fluid is able to be output;
      a first filter medium arranged between the unfiltered and filtered sides; and
      a second filter medium arranged between the unfiltered and filtered sides and having a higher relative pressure loss than the first filter medium in a flow direction of the fluid from the filtered side to the unfiltered side,
      wherein the first filter medium is a surface filter, and the second filter medium is a depth filter, wherein during a normal operation, the second filter medium is configured for primarily filtering out particles present in the fluid, and
      wherein the second filter medium is operable in a reverse operation in which a pumping direction is reversed, which causes the fluid to primarily flow through the first filter in a return flow direction,
   wherein the second filter medium has a surface that is exposed to the unfiltered side of the filter element that is larger than a surface of the first filter medium that is exposed to the unfiltered side,
   wherein the first filter medium has a planar surface, and the second filter medium has a zigzag shaped surface.

10. The filter element of claim 1, wherein in the reverse operation, the filtered side is directly connected to both the first filter medium and the second filter medium.

11. The filter element of claim 1, wherein the first filter medium is, in the reverse operation, directly connected to the unfiltered side.

12. The filter element of claim 1, wherein the second filter medium is shaped as a hollow cylinder.

* * * * *